United States Patent
Peles

(10) Patent No.: US 7,634,972 B2
(45) Date of Patent: Dec. 22, 2009

(54) MILKING CUP LINER

(76) Inventor: Zalman Peles, Cfar Corazim, M. P. Corazim (IL) 12391

( * ) Notice: Subject to any disclaimer, the term of this patent is extended or adjusted under 35 U.S.C. 154(b) by 207 days.

(21) Appl. No.: 11/660,310

(22) PCT Filed: Aug. 16, 2005

(86) PCT No.: PCT/IL2005/000891

§ 371 (c)(1),
(2), (4) Date: Feb. 15, 2007

(87) PCT Pub. No.: WO2006/018845

PCT Pub. Date: Feb. 23, 2006

(65) Prior Publication Data

US 2007/0283892 A1    Dec. 13, 2007

(30) Foreign Application Priority Data

Aug. 17, 2004    (IL) ...................................... 163585

(51) Int. Cl.
*A01J 5/04* (2006.01)
(52) U.S. Cl. .................................................. 119/14.31
(58) Field of Classification Search ............. 119/14.31, 119/14.08, 14.29, 14.54, 14.52, 14.47, 14.48
See application file for complete search history.

(56) References Cited

U.S. PATENT DOCUMENTS

| | | | |
|---|---|---|---|
| 904,564 A | * | 11/1908 | Ripczinske .............. 119/14.52 |
| 1,048,481 A | | 12/1912 | Aslakson |
| 1,106,846 A | | 8/1914 | Rieske |
| 1,465,002 A | * | 8/1923 | Schawang ................ 119/14.31 |
| 3,845,743 A | | 11/1974 | Van Staveren |
| 4,200,058 A | * | 4/1980 | Happel ..................... 119/14.01 |
| 5,762,020 A | | 6/1998 | Van der Lely |
| 6,427,624 B1 | | 8/2002 | Briggs et al. |

* cited by examiner

Primary Examiner—Yvonne R. Abbott
(74) Attorney, Agent, or Firm—Bacon & Thomas, PLLC

(57) ABSTRACT

An elongated teat cup liner (1) located inside said teat cup, which is having a proximal portion in communication to the milking vacuum system and the milk pail and a distal portion in communication with the animal teat; said teat cup liner comprising: a plurality of segments (1*f*-1*h*) barriered by a means of one or more rings (1*a*); and, a vacuum duct comprising a plurality of vacuum valves (3*b*-3*d*); each of said valve is in communication with one or more rings and is adapted to provide a reversible inflation/deflation of elastomeric rubber-like sleeve.

7 Claims, 9 Drawing Sheets

MILKING CUP LINER

FIELD OF INVENTION

The present invention relates to an automatic milking systems and more specifically to a teat cup and liner. Furthermore, the present invention provides an automatic assembly for milking domestic animals by said liner, and to a method of milking thereof.

BACKGROUND OF THE INVENTION

A milking machine is commonly practice on medium to large dairy farms. The machine sucks the milk out of the teat by vacuum and includes a vacuum pump, a vacuum vessel, which also serves as a milk-collecting pail, a plurality of two or four teat cups connected by hoses to a manifold and a vacuum vessel, and a pulsator, which alternately applies vacuum and atmospheric pressure to the teat cups. The teat cup unit consists of a rigid outer case containing an inner elongated tube of elastomeric material (e.g., rubber), called the teat cup liner. The inside of the liner, in contact with the teat, is subjected to a constant vacuum of about 0.5 Bar during milking. The pressure in the pulsation chamber between the liner and teat cup is regularly alternated by the pulsator between 0.5 Bar during the suction phase and atmospheric pressure during the massage phase. The result is that milk is sucked from the teat cistern during the suction phase. During the massage phase the teat cup liner is pressed together to stop milk suction, allowing a period of teat massage and for new milk to run down into the teat cistern from the udder cistern. This is followed by another suction phase, and so on. Relaxation of the teat during the massage phase is necessary to avoid accumulation of blood and fluid in the teat, which is painful to the cow and will cause her to stop letting down. The pulsator alternates between the suction and massage phases 40 to 60 times a minute.

It is know in the art that the milking by means of a teat cup liner is provided in one stroke; The suction from the vacuum source is applied in a pulsating manner to both the inside of the liner, and to a space between the shell and the liner. A differential suction pressure between the inside and outside of the liner within the shell causes this portion of the liner, which is more flexible than adjacent portions, alternately to collapse and open up. When the liner opens up, the teat experiences a greater suction causing milk to flow. When the liner closes, the suction is released, and the liner closes around the end of the teat and presses inwards on the end of the teat. Certain problems have been noted in use with this type of teat cup liner. Firstly, the liner needs to be heavy enough to stretch the animal's teat to open milk ducts. The stretching of the teat stresses the teat tissue, the milk ducts, and sphincter valve at the end of the teat. It has hitherto been believed that this stretching is a cause of inflammation of the teat secretory tissues at the base of the animal's udder, and ultimately mastitis. It has also been thought that the sudden shut off of suction could cause milk to be sucked back into the teat, thereby causing or promoting mastitis. Apart from causing the animal discomfort and pain, these problems can shorten the animal's effective working life.

U.S. Pat. No. 6,427,624 to Briggs et al. discloses a teat cup liner for milking machine. U.S. Pat. No. 5,762,020 to van der Lely teaches an automatic milking apparatus often has a disadvantage in that, when during milking one of the cups is disengaged from a teat. Mastitis is basically an economical disease that rarely kills a cow; but it degenerates part of the udder, lowering milk production, and cost high medical and vet bills. The higher producing animals are more prone to this disease then others.

There is therefore a long need to modify the currant generation of vacuum pulsating milking machines in a way that milk will stream towards the milk tank and never get squirted back into the cow's udder.

BRIEF DESCRIPTION OF THE FIGURES

In order to understand the invention and to see how it may be implemented in practice, a preferred embodiment will now be described, by way of non-limiting example only, with reference to the accompanying drawing, in which FIG. 1 schematically presents a lateral cross section of a rubber sleeve according to one embodiment of the present invention.

SUMMARY OF THE INVENTION

Figure 1:
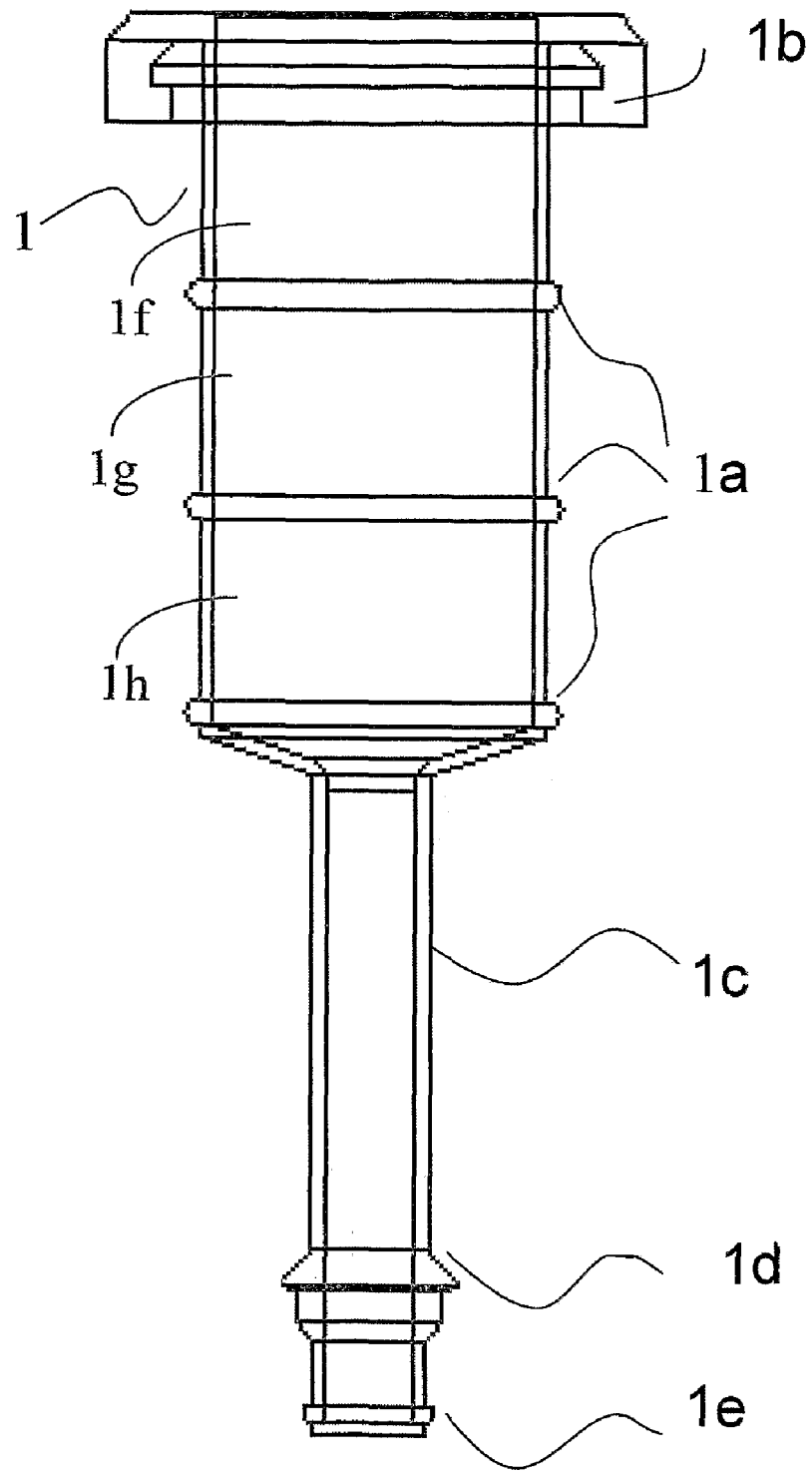

The disclosed invention designed to direct the milk stream towards the milk tank in a way that milk will never get squirted back into the cow's udder. This task achieved by creating means to divide each milking pulls of the conventional milking machine into 3 secondary pulses; by use of electronic timing device, connected and controlled by the main pulsator of the conventional milking machine. Thus, a vacuum pulls is subdivided into multiple sub pulses, thus, vacuum is directed on by electronic valves to effect consequent parts of the rubber sleeve, As shown from FIG. 4 to FIG. 10. This method prevents the back flow of mike into the udder, thus, solves the problem efficiently and on economical base without having to interfere with traditional milking techniques that are well established for commercial use.

The suckling action of the disclosed design works more accurately in terms of imitating the natural effect of the suckling on the cow, therefore the cows overall production increases.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an electronic vacuum pulsating machine i.e., a method and an automatic milking system comprising a teat cup liner and assembly for milking domestic animals.

In an electronic vacuum pulsating machine for milking domestic animals, such as cows and goats, an elongated teat cup line located inside said teat cup. This teat cup liner is having a proximal portion in communication to the milking vacuum system and the milk pail and an distal portion in communication with the animal teat. The teat cup liner comprising a plurality of segments barriered by a means of one or more rings, said ring are elastomeric rubber-like sleeve structure preventing the liner from collapsing at the milk extracting pulls; said expandable/collapsible ring is adapted to contract and/or expand in a manner selected from a ring after a ring and/or rings after rings; and, a vacuum duct comprising a plurality of vacuum valves, said inlet opening of the duct is in communication with an effective vacuum source; each of said valve is in communication with one or more rings and is adapted to provide a reversible expansion/collapsing of said elastomeric rubber-like sleeve according to a predetermined pulse control provided by a pulsator. Vacuum or air flow from the vacuum/atmospheric-pressure source, via the vacuum duct and vacuum valve to the segments in a distal-to-proximal direction, such that the ring expands and milk is filling segment whilst said ring is vacuumed, from the udder, then the vacuum pulse is terminated in the manner that the ring collapses, and a beginning of a new cycle is provided until the animal's udder is empty.

The terms "rings" and/or "segments" are referring hereinafter to any compartments, chambers, expandable members and the like, adapted to reversibly expand and collapse to a predetermined initial and terminal diameter and size.

A method for milking domestic animals by means of the aforesaid teat cup line is also provided. This method comprising applying vacuum pulses (e.g., 0.5Bar, 40 to 60 times a minute) to a plurality of elastomeric rubber-like sleeve segments such that vacuum or air is flow from the vacuum/atmospheric-pressure source, via the vacuum duct and vacuum valve to the segments in a distal-to-proximal direction, such that the ring expands and milk is filling segment which is vacuumed in its turn, from the udder, then the vacuum pulse is terminated in the matter that the ring collapses, and a beginning of a new cycle is provided until the animal's udder is empty.

Automatic milking system comprising inter alia the following ingredients:
a. a vacuum pump, such as an electric motor driven pump, connected with vacuum hoses and a manifold to a set of valves adapted to suck of the milk from the cow's udder to a refrigerated central vacuum-sealed milk pail by steady vacuum;
b. a pulsator regulating the vacuum and atmospheric pressure by means of a pulsing valve action which is directing the vacuum or allowing atmospheric pressure on each pulse towards the milking cups assembly, thus alternatively massaging/pressing the teat of the animal;
c. a milking cup assembly comprising inter alia a solid (usually rigid) elongated cup shaped structures, e.g., assembly of four cups for cattle milking, and/or two cups for goats and sheep milking, that can accommodate a teat of the said milking animals; inside said cup is an elastomeric sleeve-like liner, which is held tightly to the teat by the aforesaid system providing for a steady vacuum.

Commercially available milking process of an animal by the automatic milking system is usually provided in the following sequence:

Step one: applying a steady vacuum that hold the teat cup liner tightly to the teat and sucking any amount of milk that is available inside the teat and directs it to the main milk storage tank by means of allowing small amount of atmospheric air to be sipped into the piping system.

Step two: directing part of the systems constant vacuum into the teat cup by means of a pulsator such that constant vacuum in and around the internal side of the teat cup liner matches the vacuum which is created in the teat cup and thus forcing the teat to wide open in the manner that milk is forced to flow from the udder into the rubber sleeve.

Step three: Opening a way, after a short time span, by means of the pulsator, e.g., by moving a valve until atmospheric pressure is obtained at the space between the teat cup liner and the cup; such that a constant vacuum in and around the internal side of the teat cup liner causes the teat to shrink, and thus, squeezing the milk which is accumulated inside the teat along the former vacuum pulls; said milk outflow to any possible opening, such as through the sphincter to the milk collecting pipe.

This milking process is characterized by few economical related e.g., mastitis and technical drawbacks. The present invention is surprisingly provided a cost effective and mastitis-free milking system entitled "an electronic vacuum pulsating machine". It uses similar technical elements to extract the milk out of the animal udder, wherein it utilizes a new innovative different design of the milk cup and the sleeve Reference is made now to FIG. 1, schematically presenting a lateral cross section of teat cup according to one embodiment of the present invention. The inner portion of teat cup is including a novel teat cup liner (1) which is adapted to contract and/or expand segment after segment, the segments 1f-1h are defined by a widening of the elastomeric structure (hereinafter "rings") of the sleeve in multiple locations to a shape of a ring (see 1a) with a thin skeletal spring ring inside it, which prevents it from collapse at the milk extracting pulls. The elongated teat cup (1) is having a distal portion, in communication with the animal's teat base (1d); and a proximal portion in communication (see adapter 1e) with the vacuum system. The teat cup liner (1) also comprising an elongated open-bore neck (1c) and proximal rim (1d).

It is acknowledged in this respect that the term segment is refereeing hereinafter to compartments, chambers, inflatable members (e.g., tubes, conduits, finger-like or sack-like bulbs etc) and the like, adapted to reversibly inflate and deflate to a predetermined initial and terminal diameter and size. It is also acknowledged that a plurality of N segments is possible, wherein N is any integer number higher or equal 2. For example only, three segments in one series are hereto described, wherein any number of segments and any 2D or 3D array of segments, sub-segments, coupled segment etc is possible.

Figure 2:
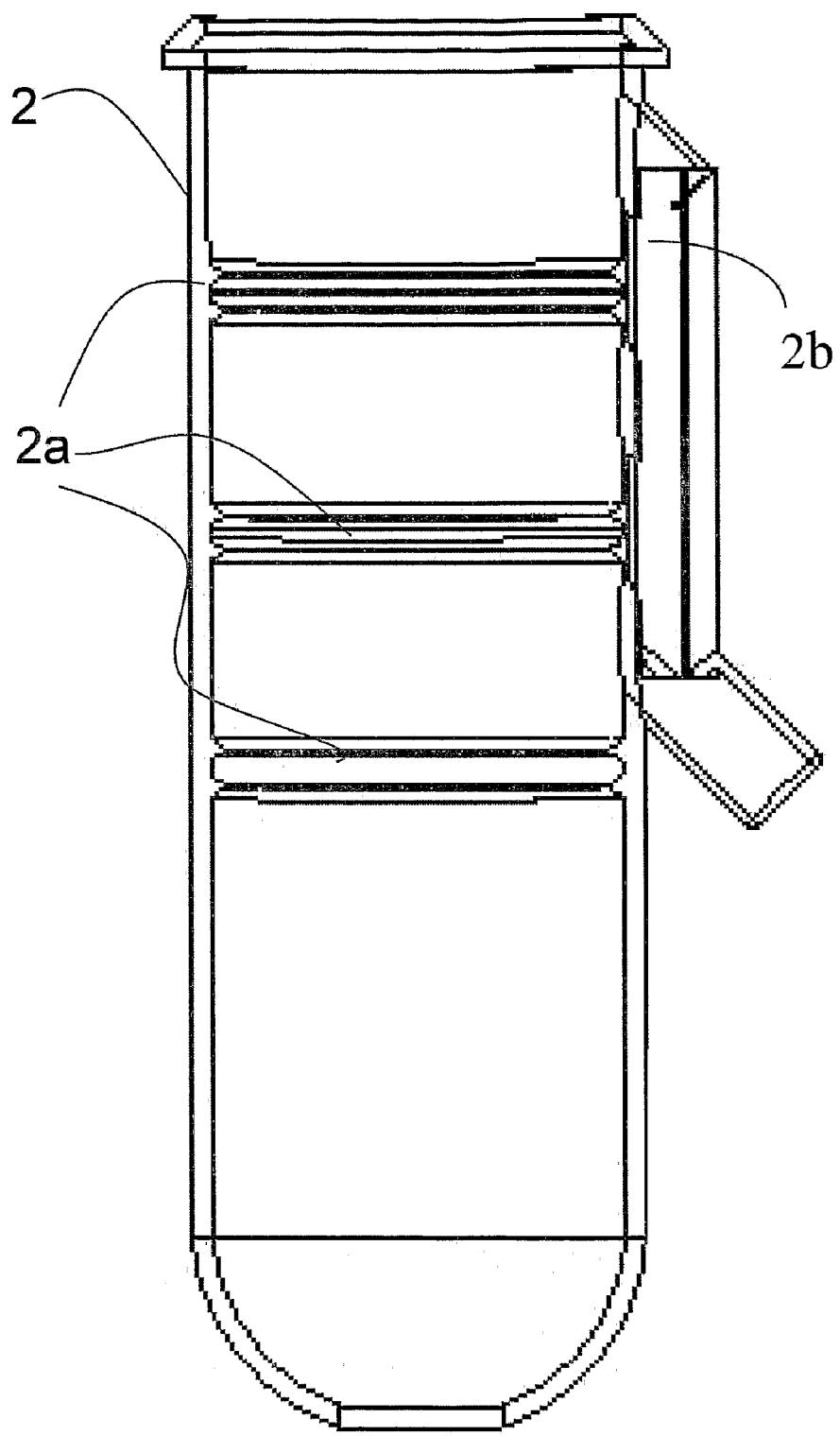
FIG. 2 schematically presents a lateral cross section of a teat cup.
Figure 3:
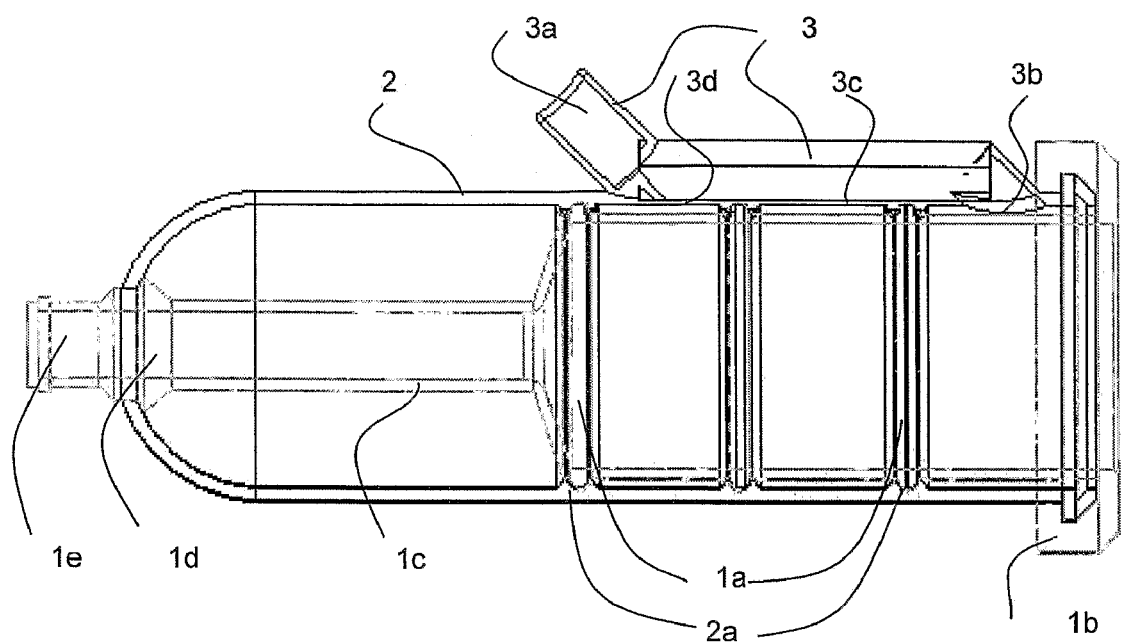
FIG. 3 schematically presents a teat cup assembly according to another embodiment of the present invention.

Reference is made now to FIG. 2, schematically presenting a lateral cross section of a teat cup (2) wherein the rings (2a) between the various compartments are magnified. An elongated inlet tube (2b) is located along the teat cup (2) and comprising three valves adapted to provide vacuum or atmospheric pressure towards each of the rings (2a). Reference is made now to FIG. 3 schematically presenting a teat cup assembly according to another embodiment of the present invention. An electronic timing device starts to act and sends an order to the valve body, to open way for vacuum to the surrounding of the third compartment (at the very distal portion), thus, the second part of the teat fills up with milk. This maneuver is possible by applying vacuum or atmospheric pressure throughout opening (3a) along arrow (3) and valve (3b), wherein the second valve (3c) remains in its close configuration.

Figure 4:
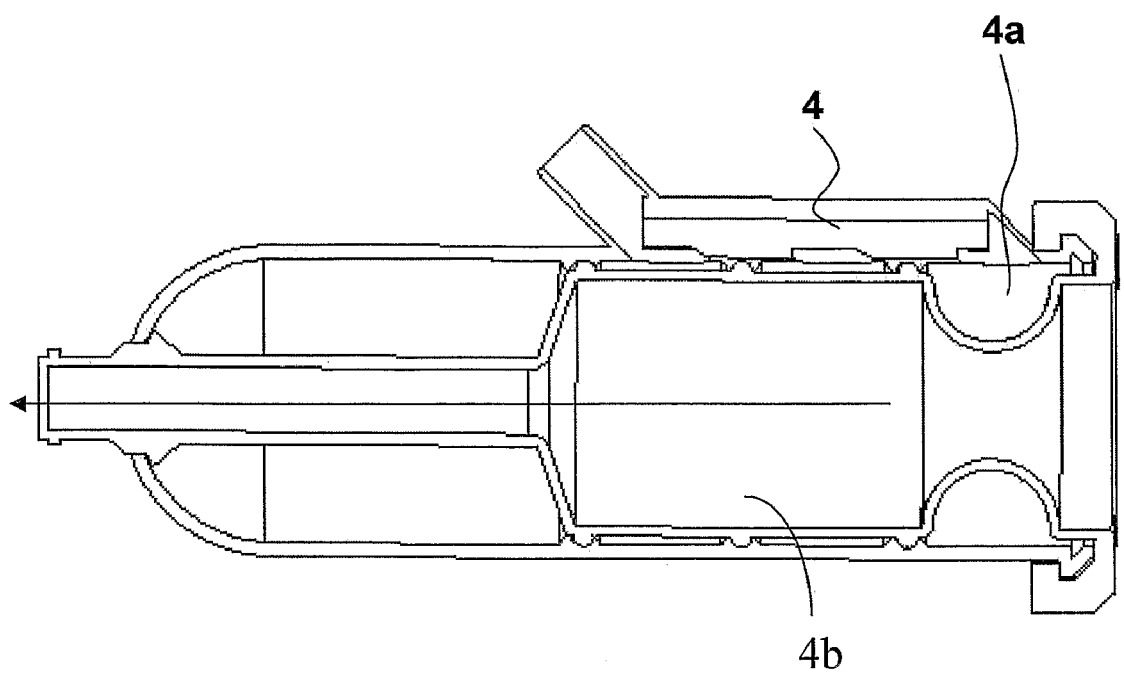
FIG. 4 schematically presents a view wherein the air pulls—first sub pulls collapses sleeve section, thus, pushing milk by arrow direction out to tank.

Reference is made now to FIG. 4, schematically presenting a view wherein the air pulls and first sub pulls collapses sleeve section, thus, pushing milk by arrow direction out to tank. More specifically, at the end of the said electronic pulses; the vacuum pulsator opens to allow an "atmospheric pressure pulls" configuration into the valve assembly, and hence allows it to enter the first segment (4a) via tube (4) around the sleeve. It inflates thus around the teat and squeezes that part of the teat, causing it to squeeze milk that is in it towards the exit of the teat cup liner.

Figure 5:
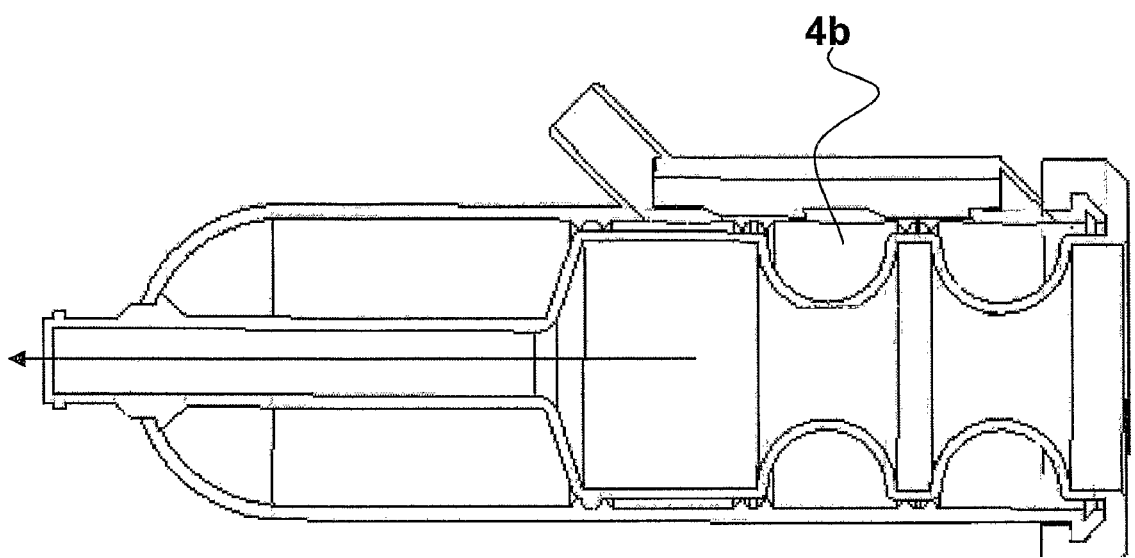
FIG. 5 schematically presents a view wherein the air pulls—second section of rubber sleeve collapses.

Reference is made now to FIG. 5, schematically presenting a view wherein the air pulls and second section of rubber sleeve collapses. The electronic timing device gets into consequent action and sends an order to the valve body, to open way for atmospheric pressure to the surrounding of the second compartment (4b), thus, the second part of the rubber sleeve inflates around that part of the teat, causing it to squeeze milk that is in it towards the exit of the teat cup liner.

Figure 6:
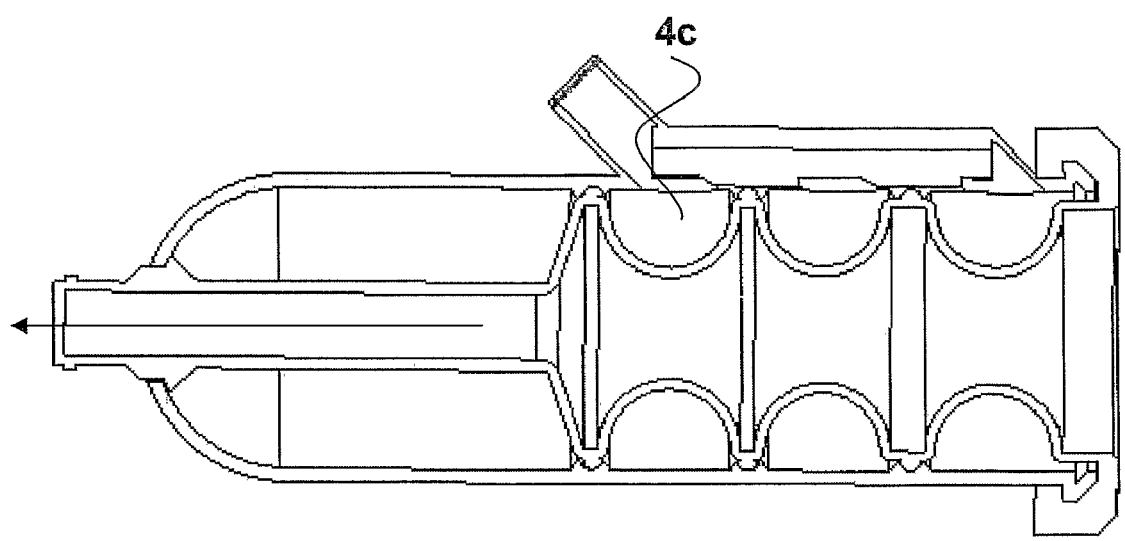
FIG. 6 schematically presents a view wherein the air pulls—third section of rubber sleeve collapses, end of sub pulses of air pulls.

Reference is subsequently made to FIG. 6, schematically presenting a view wherein the air pulls and third section of rubber sleeve collapses, end of sub pulses of air pulls. The electronic timing device activates the valve body to open way for atmospheric pressure to the surrounding of the third compartment (4c), thus, the third part of the rubber sleeve inflates around that part of the teat, causing it to squeeze milk that is in it towards the exit of the teat cup liner.

It is also in the scope of the present invention wherein a secondary pulsating valve assembly (e.g., assembled in the vacuum inlet nuzzle) containing electronically controlled valve elements, is directing vacuum or air from the main pulsator into each of the said compartments at a sequence.

Figure 7:
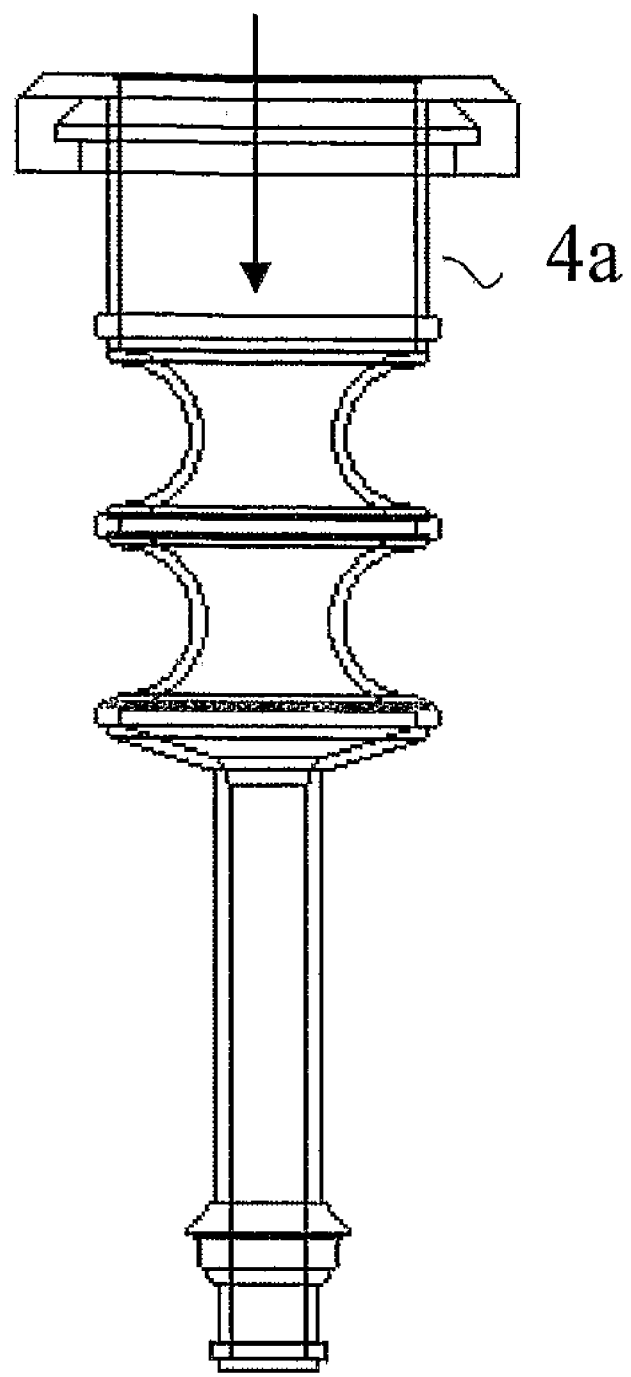
FIG. 7 schematically presents a view wherein the vacuum pulls—first sub pulls expands sleeve section, thus, filling milk from the udder by arrow direction.

The present invention further discloses a novel method for milking domestic animals by a means of the electronic vacuum pulsating machine as defined and described above. The milking procedure starts as the teat cup assembly placed on the cow's teat. Reference is made now to FIG. 7, schematically presenting a view wherein the vacuum pulls and first sub pulls inflates sleeve section, thus, filling milk from the udder by arrow direction. The vacuum pulsator sends vacuum pulls to the valve assembly that allows it to enter the first compartment (4a) around the sleeve, thus, inflates that part of the teat, coasting it to feel with milk from the udder.

Figure 8:
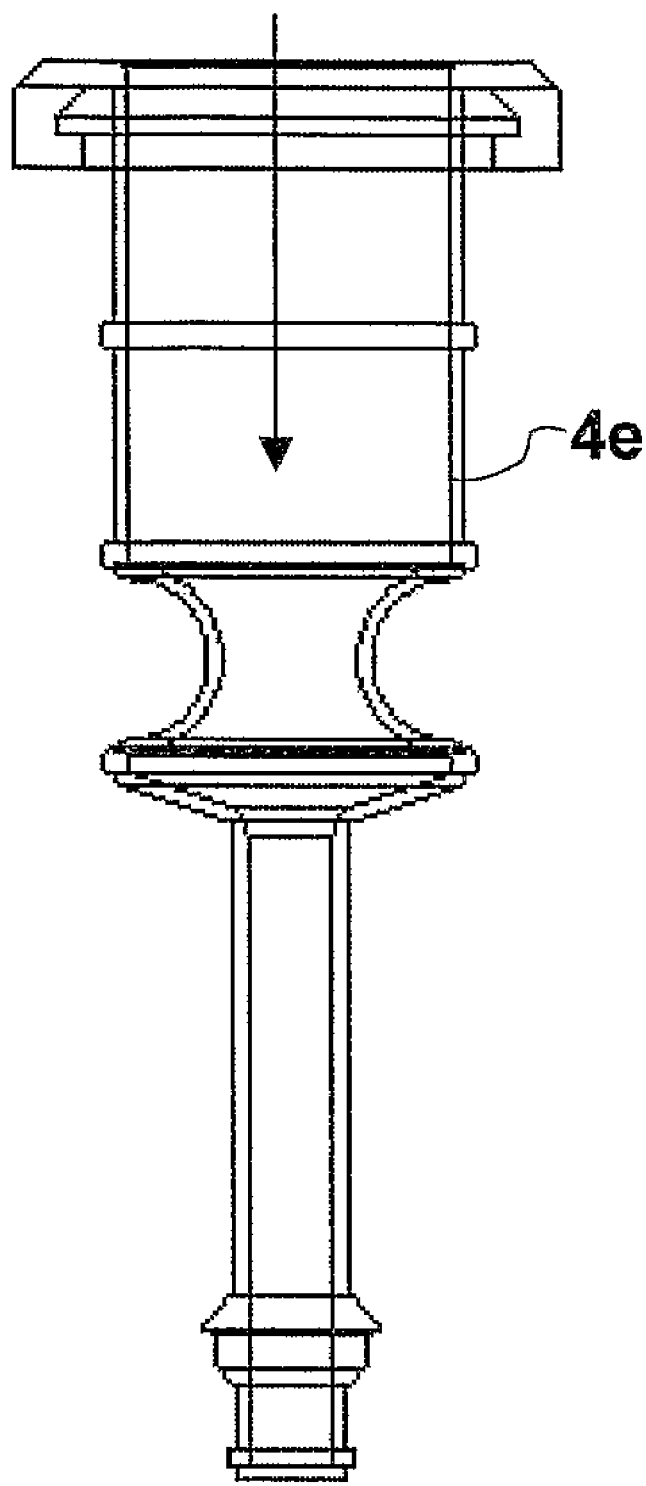
FIG. 8 schematically presents a view wherein the vacuum pulls—second sub pulls inflates sleeve section, thus, filling milk from the udder by arrow direction.

Then, the vacuum pulls again and a second sub pulls inflates sleeve section, thus, filling milk from the udder by arrow direction (see FIG. 8). The electronic timing device opens hence valve body, and facilitate an open way for vacuum to the surrounding of the second segment (4e), thus, the second part of the teat fills up with milk.

Figure 9:
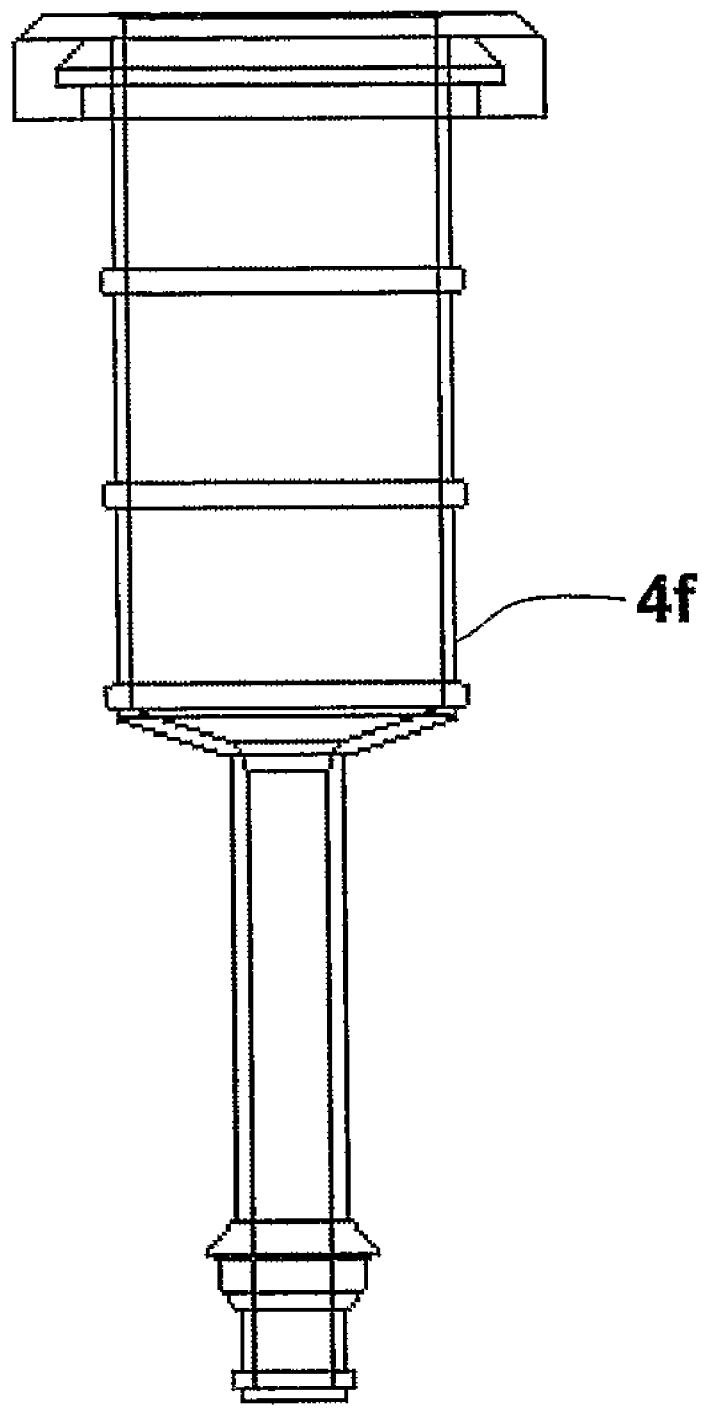
FIG. 9 schematically presents a view wherein the vacuum pulls—third sub pulls expands sleeve section, thus, filling milk from the udder by arrow direction, end of vacuum pulses, and beginning of recycle to FIG. 4, wherein the air pulls—first sub collapses sleeve section.

Lastly, the vacuum pulls a third sub pull and inflates sleeve section (see FIG. 9). Milk is filling segment (4f) from the udder, end of vacuum pulses, and beginning of recycle to said first sub pulls collapses sleeve section.

This process goes on consequently until the udder is emptied. Because of the sequent of the electronic milking pulsing a situation of milk being squirted back into the cow's udder is avoided, and that is why the machine can reduce the danger of Mastitis.

It is evident that the present invention provides a novel multiple inflation sequence, and an effective electronic timing means for consequent multiple pulsations. Moreover, the electronic vacuum pulsating machine hereto defined and described electronic vacuum pulsating machine is adapted for improving the milking process such that Mastitis is avoided.

The invention claimed is:

1. In an electronic vacuum pulsating machine for milking domestic animals, including a teat cup, such as cows and goats, including a teat cup, an elongated teat cup liner located inside said teat cup; said teat cup liner having a proximal portion in communication to a milking vacuum system and a milk pail and an distal portion in communication with the animal teat; said teat cup liner comprising:
   a. a plurality of segments barriered by a means of one or more expandable/collapsible rings, said one ore more expandable/collapsible ring are elastomeric rubber-like sleeve structure preventing the liner from collapsing at the milk extracting pulls; said one or more expandable/collapsible rings is adapted to contract and/or expand in a manner selected from a ring after a ring and/or rings after rings; and,
   b. a vacuum duct comprising a plurality of vacuum valves, said inlet opening of the duct is in communication with an effective vacuum source; each of said valve is in communication with one or more rings and is adapted to provide a reversible expansion/collapsing of said elastomeric rubber-like sleeve according to a predetermined pulse control provided by a pulsator;

wherein vacuum or air flows from the vacuum/atmospheric-pressure source, via the vacuum duct and vacuum valve to the segments in a distal-to-proximal direction, such that said ring expands and milk is filling said segment whilst said ring is vacuumed from the udder, then the vacuum pulse is terminated in the manner that said ring collapses and a beginning of a new cycle is provided until the animal's udder is empty.

2. The teat cup liner according to claim 1, wherein said expandable/collapsable rings are selected from compartments, chambers, expandable members adapted to reversibly expand and collapse to a predetermined initial and terminal diameter and size.

3. The teat cup liner according to claim 1, wherein a plurality of N segments used, wherein N is any integer number higher or equal 2, said plurality of segments are arranged in any 2D or 3D array of segments, sub-segments, coupled segments or any combination thereof.

4. An automated milking robot comprising the teat cup liner as defined in claim 1 or any of its dependent claims.

5. The teat cup liner according to claim 1, wherein said segments are selected from compartments, chambers, expandable members, adapted to reversibly expand and collapse to a predetermined initial and terminal diameter and size.

6. The teat cup liner according to claim 1, wherein a plurality of N rings used, where in N is any integer number higher or equal to 2, said plurality of rings are arranged in any 2D or 3D array of rings, sub- rings, coupled rings or any combination thereof.

7. A method for milking domestic animals by means of the teat cup liner as defined in claim 1 or in any of its dependent claims comprising applying vacuum pulses to a plurality of elastomeric rubber-like sleeve segments such that vacuum or air flows from the vacuum/atmospheric-pressure source, via the vacuum duct and vacuum valve to the segments in a distal-to-proximal direction, such that the ring expands and milk is filling said segment whilst said ring vacuumed from the udder, then the vacuum pulse is terminated in the manner that said ring collapses, and a beginning of a new cycle is provided until the animal's udder is empty.

* * * * *